United States Patent [19]

Myers

[11] 4,278,863
[45] Jul. 14, 1981

[54] METHOD OF MAKING WELDED STRUCTURE

[75] Inventor: Robert D. Myers, West Allis, Wis.

[73] Assignee: Harnischfeger Corporation, West Milwaukee, Wis.

[21] Appl. No.: 67,875

[22] Filed: Aug. 20, 1979

[51] Int. Cl.³ .............................................. B23K 25/00
[52] U.S. Cl. ................................. 219/73.1; 219/137 R
[58] Field of Search ........................... 219/73.1, 137 R

[56] References Cited

U.S. PATENT DOCUMENTS 1,810,005  6/1931  Burnish ............................ 219/137 R

FOREIGN PATENT DOCUMENTS

940227  9/1961  United Kingdom ................. 219/13 R

Primary Examiner—E. A. Goldberg
Attorney, Agent, or Firm—James E. Nilles

[57] ABSTRACT

Large metal structures for heavy duty machines are prefabricated from subassemblies. The subassemblies are made with matched grooves, and held together. The subassemblies are machined taken apart transported to the field reassembled and electroslag welded in the area of the grooves.

8 Claims, 13 Drawing Figures

METHOD OF MAKING WELDED STRUCTURE

BACKGROUND OF THE INVENTION

1. Field of Use

This invention relates generally to large metal structures which serve as component parts of heavy duty mobile machines, such as mining shovels, and to methods for making such structures. In particular it relates to field assembly of such structures from prefabricated subassemblies using electroslag welding techniques.

2. Description of the Prior Art

Certain types of machines, such as mining shovels and the like, are so large physically that it is impossible to construct them in a plant or factory and then ship them in finished form to their final destination, as is the usual practice with smaller machines. Accordingly, it is necessary to prefabricate subassemblies in a factory and ship them, usually by railroad, to some destination such as the final job site, whereat the subassemblies are field assembled into component parts or structures which go to make up the finished machine. This procedure creates several problems which are costly and time-consuming to overcome. For example, the subassemblies being shipped must be limited in size and weight so that they will fit on the railroad cars used for transport. Furthermore, since considerable welding is required to join the subassemblies in the field, it is necessary to provide complete welding facilities in the field which is time-consuming and costly. Factory welding and field welding of large heavy metal components often adapt to the use of electroslag welding techniques and such specialized equipment can be provided for use in the field. It should be noted that, at present, inhouse manufacturing costs are about one-fourth the cost of field assembly, if conventional prior art techniques are followed. Very often, final field assembly of two or more subassemblies require very elaborate jigs to ensure and maintain accurate alignment of the subassemblies as they are being welded together. For example, two adjacent subassemblies may each embody or define accurately machined bearing surfaces, bores, holes or passages which must be accurately positioned relative to each other to ensure proper operation of the finished machine. While such alignment can be expeditiously accomplished in a factory environment where proper facilities, cranes, jigs and tools are readily accessible and permanently installed, it is difficult to meet such requirements in a temporary field installation.

The following patents illustrate some of the problems and practices encountered in the foregoing situation.

U.S. Pat. No. 4,129,773 and 4,104,504 both teach the use of electroslag welding to join together two sections of a large dipper bucket for a mining shovel, Both patents teach a horizontal weld and both appear to employ a conventional mold such as water cooled copper shoes at the sides of the weld. U.S. Pat. No. 4,129,773 is concerned with the materials of which the electroslag welding device is constructed. U.S. Pat. No. 4,104,504 is concerned with a method involving welding base metal of manganese steel by means of a guide and weld wire selected of certain materials. U.S. Pat. No. 4,040,362 is of interest because it teaches a method of constructing a large railway car component from two sub-components and filling a cylindrical metal-receiving void therebetween with weld material. This patent is concerned with electric arc welding as distinguished from electroslag welding. U.S. Pat. No. 4,045,648 is of interest because it shows electroslag welding processes wherein the electrode is withdrawn through passages of various cross-sectional configurations. However, it appears in all cases that at least one side of the passage is defined by some sort of conventional backing material such as copper, aluminium, etc. in the form of a water-cooled shoe.

SUMMARY OF THE PRESENT INVENTION

A welded structure and method for making the same in accordance with the invention are well-adapted for use in fabrication of component parts of large heavy duty mobile machines, such as mining shovels or the like. Such a mining shovel generally comprises a lower section, including a chassis and crawler tracks, and a relatively rotatable upper section, including a frame or bed on which the shovel mechanism, engine and operator's cab are mounted. The frame of the rotatable upper section of a large (50 yd.) mining shovel is on the order of 40' long, 24' wide and 6' thick and weighs about 200 tons. The frame includes on its lower side an annular projection having a precisely machined and finished surface which serves as a slewing ring bearing surface which mates with and rests upon rollers carried on the lower section of the mining shovel. Since such a frame is too large for railroad transport because it exceeds roadbed width limitations, it is constructed in accordance with the invention in three prefabricated metal subassemblies, two each about 40' long, 6' wide and 6' thick and one piece about 40' long, 12' wide and 6' thick so as to be transportable by rail from factory to final assembly site.

The method for fabricating the large metal frame or structure from a plurality of metal subassemblies, requires that each subassembly include a side plate which abuts a corresponding side plate in an adjacent subassembly in said metal structure. The method comprises the steps of: fabricating at the factory the required number of subassemblies, each having vertical welding grooves in the side plate which confronts a corresponding side plate in an adjacent subassembly; temporarily joining the subassemblies together at the factory so that the grooves are in registry with each other and define welding tubes; performing machining operations as required at the factory on surfaces of the subassemblies while the latter are temporarily joined (i.e., so as to provide a slewing ring bearing surface); disjoining the subassemblies; transporting the subassemblies to a different location, such as the final job site for the shovel; rejoining the subassemblies at the job site so that the machined surfaces and the welding groove are substantially in the same relative relationship to each other as when the factory machining operations were performed; and filling the vertical welding tubes with molten welding material which is allowed to solidify therein to permanently join the subassemblies to one another, as by employing an electroslag welding technique using an elongated consumable electrode.

Each welding groove, preferably semi-cylindrical in cross-section, is formed in a side plate at a precise location by conventional machining techniques using a special formed cutter and is cut before the side plate is joined (as by welding) with other plates forming a particular subassembly.

The adjacent subassemblies are temporarily joined together at the factory by means of bolt and nut assemblies, and each bolt extends through precisely positioned bolt holes which are drilled through the mating side plates of adjacent subassemblies.

The adjacent subassemblies are precisely positioned and aligned relative to each other during their initial temporary joinder at the factory and during subsequent rejoinder and final welding in the field by means of keys which engage precisely positioned and aligned key slots formed by machining in the mating side plates of adjacent subassemblies. The key slots are machined prior to assembly of the side plates in their respective subassemblies. Precise realignment of the subassemblies ensures that machined surfaces, such as the slewing ring bearing surfaces and vertical bores provided at the factory, will also be precisely realigned in the finished frame.

Each welding joint defined by the registering welding grooves in mating side plates of adjacent subassemblies is preferably filled with molten welding material by means of a consumable electrode employed in the electroslag welding process, and such welding process also effects melting of portions of the walls of the welding grooves.

Since each welding joint is defined solely by the materials being joined together by welding, the use of water-cooled removable shoes is elimated. Furthermore, the mass of the metals being joined effects heat dissapation and weld solidification.

The structures and methods in accordance with the invention provide numerous advantages over the prior art. For example, improved electroslag welding techniques which are simpler than existing electroslag welding techniques, are employed. The improved assembly method requires a minimum of fixtures and jigs, and also provides a high quality weld. Larger structures fabricated of subassemblies can be assembled because of the high quality of applicant's improved welding method. More specifically, vertical fillet welding using commercial stick electrodes and techniques can only proceed at a maximum rate of about 1 to 3 pounds of welding material per hour and such welds have a shallow depth. On the contrary, welds in accordance with the present invention can be up to 8 feet in depth and are located at intervals between mating surfaces, not merely along exposed edges. The cost and complexity of field installations required for final field assembly of large structures are substantially reduced and the time required for final assembly is also substantially reduced by many weeks or months. Precision machining of critical surfaces and bores can be carried out more easily in the factory, with the assurance that accurate realignment of such surfaces and bores in adjoining subassemblies will result during final assembly in the field.

Other objects and advantages will hereafter appear.

DESCRIPTION OF A PREFERRED EMBODIMENT

Figure 1:
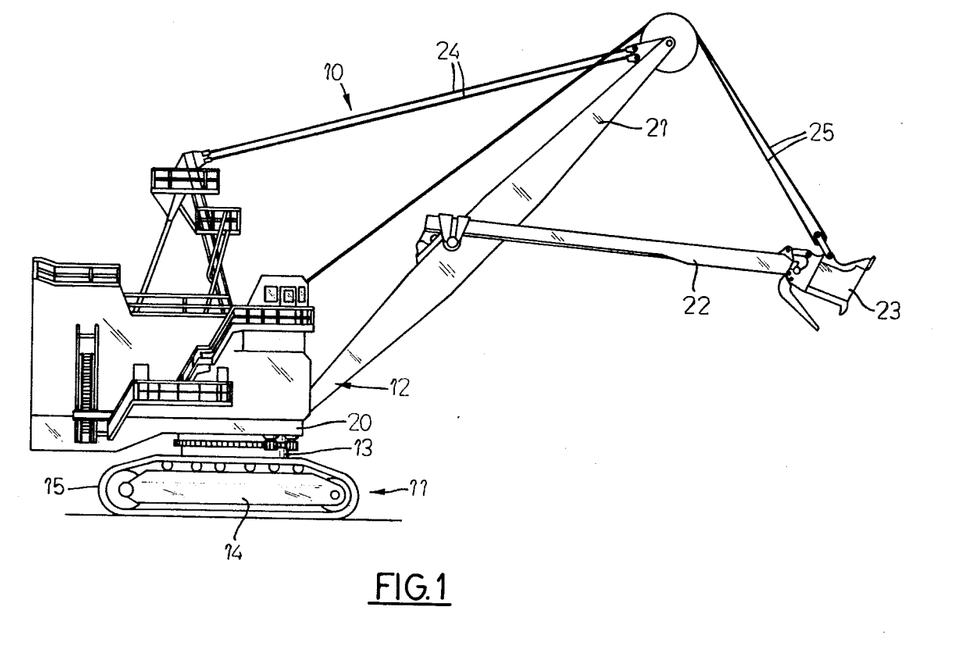
FIG. 1 is a side elevational view of a large machine, such as a mining shovel, having a revolving frame in the upper section carbody and boom thereof which are prefabricated and field-assembled in accordance with the present invention.

FIG. 1 is a side elevational view of a large machine, such as a mining shovel 10, having a lower section 11 and a rotatable upper section 12 mounted thereon and of the type wherein a structure and method in accordance with the invention are advantageously employed. Lower section 11 comprises a carbody 13 and side frames 14 having driven crawler belts or tracks 15 thereon. Upper section 12 includes a revolving frame 20 rotatably supported on carbody 13 of lower section 11 and supports a shovel mechanism including a boom 21, dipper handle 22, dipper 23, boom suspension cables 24, hoist cables 25 and related components.

Revolving frame 20, carbody 13 and boom 21 are all constructed by a method in accordance with the present invention. Frame 20 comprises three frame subassemblies 35, 36 and 37 which are fabricated in a factory, shipped to a job site remote from the factory, and finally assembled in the field into the finished frame 20, whereafter the other components (except carbody 13 and boom 21) of mining shovel 10 are mounted on the finished frame in the field.

Finished frame 20 is provided with support brackets 34 on its upper side, with a slewing ring bearing surface 40 on its lower side, and with a centrally located bore 41 and four parallel radially extending located bores therethrough. The subassemblies 35, 36 and 37 are fabricated in the factory and the brackets 34, bearing surface 40, bore 41, and bores 41a are provided or installed at that stage. The subassemblies 35, 36 and 37 are precisely aligned, temporarily secured together and welded together in the field.

Figure 2:
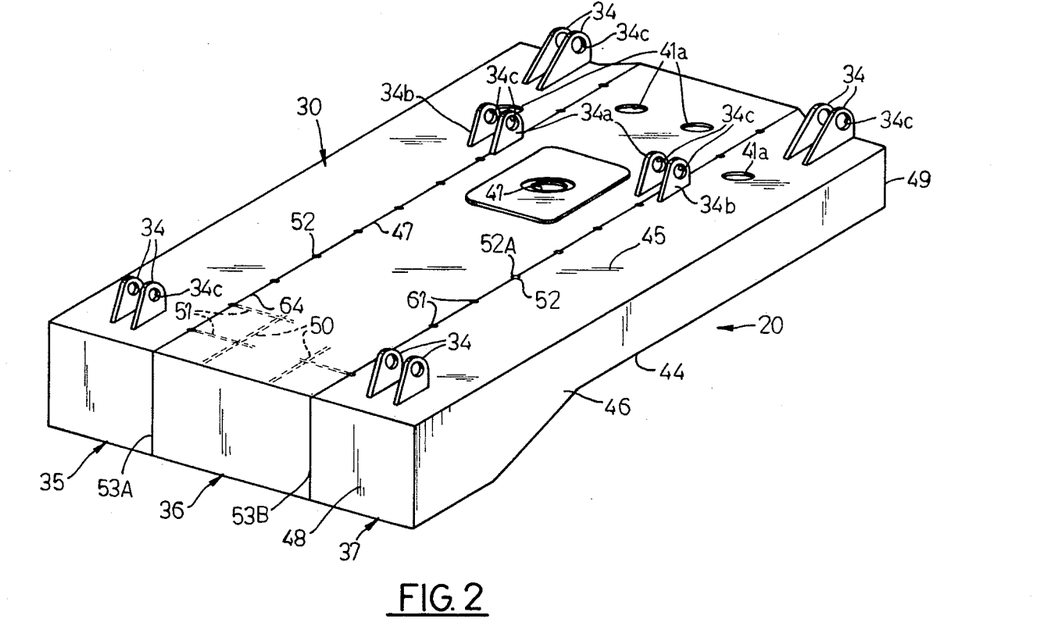
FIG. 2 is an enlarged isometric view of the top or upper side of the frame shown in FIG. 1.
Figure 3:
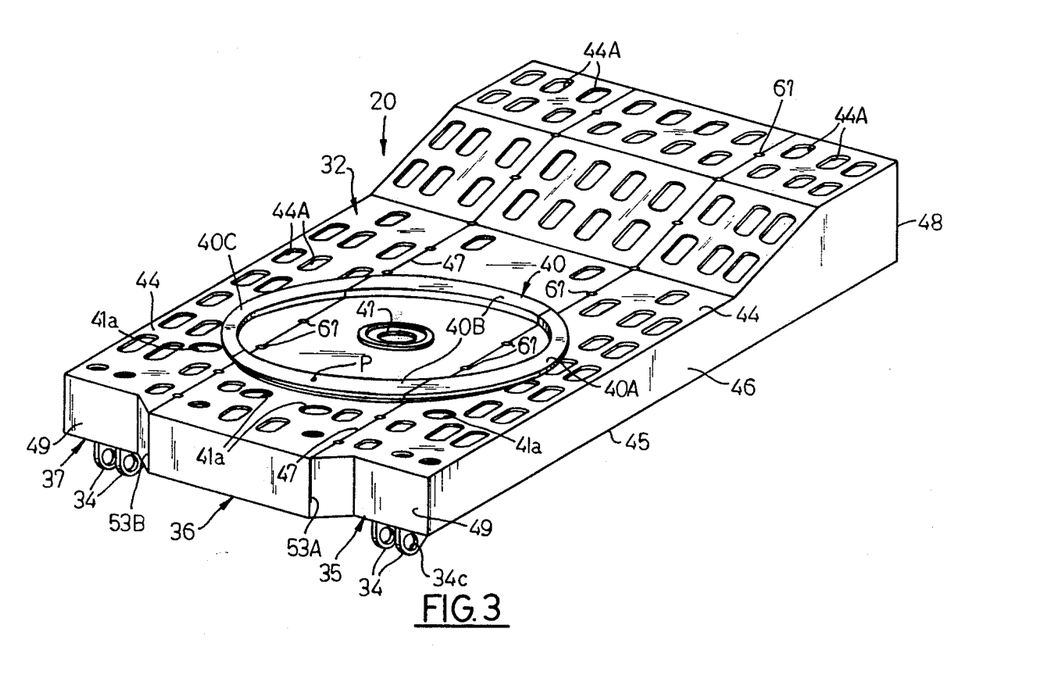
FIG. 3 is an enlarged isometric view of the bottom or lower side of the frame shown in FIGS. 1 and 2.
Figure 4:
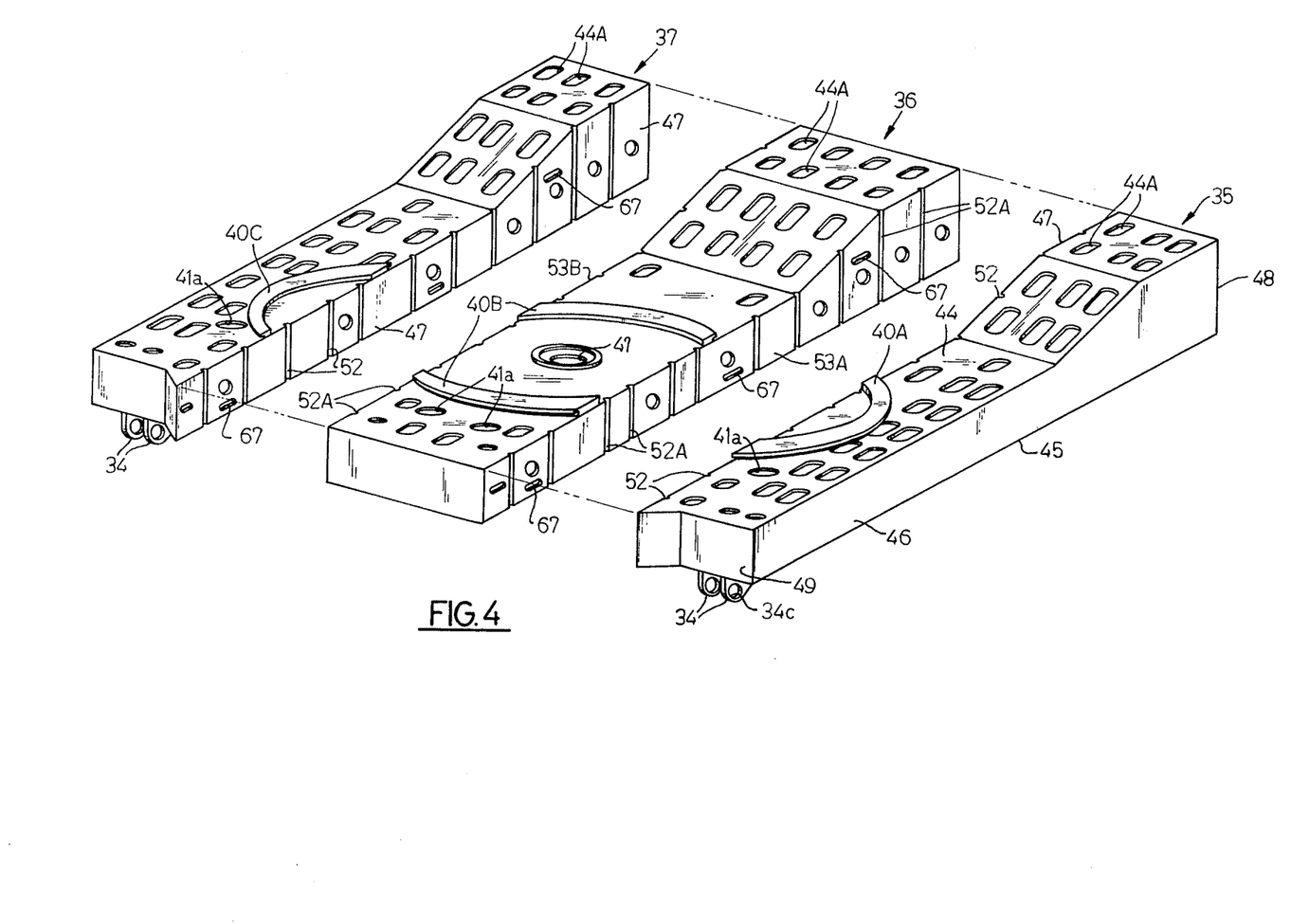
FIG. 4 is an enlarged isometric exploded view of the frame showing the separated subassemblies thereof subsequent to prefabrication but prior to field assembly.

FIGS. 2 and 3 are enlarged isometric views of the top or upper side 30 and bottom or lower side 32, respectively, of the revolving frame 20. As FIG. 2 shows, upper side 30 of frame 20 has a plurality of attachments or support brackets 34 thereon by means of which the hereinbefore described shovel mechanism components are suecred to the frame. As FIGS. 2, 3 and 4 show, frame 20 comprises three frame subassemblies designated 35, 36 and 37. Subassemblies 35 and 37 each have a pair of support brackets 34 at the front and rear ends thereof and on the upper side 30 of frame 20. Each bracket 34a is associated with a bracket 34b intermediate the front and rear ends and on the upper side of subassembly 36. The brackets 34a and 34b each have a mounting hole 34c therein which must be precisely and accurately aligned with each other. Similarly, the holes 34c in the brackets 34 at the rear end of frame 20 must be so aligned with each other, as must the holes 34c in the brackets 34 at the front end of the frame.

Frame 20 is revolvable on carbody 13 and accordingly is provided on its lower side 32 with a slewing ring bearing surface 40 of annular configuration which engages rollers (not shown) understood to be mounted on carbody 13 and also includes a passageway or bore 41 which accommodates electric cables and hydraulic hoses (not shown) which extend between the upper section 12 and lower section 11 of shovel 10. Bearing surface 40 of frame 20 is defined by three machined surfaces designated 40A, 40B and 40C which are provided on the three subassemblies 35, 36 and 37, respectively.

Figure 9:
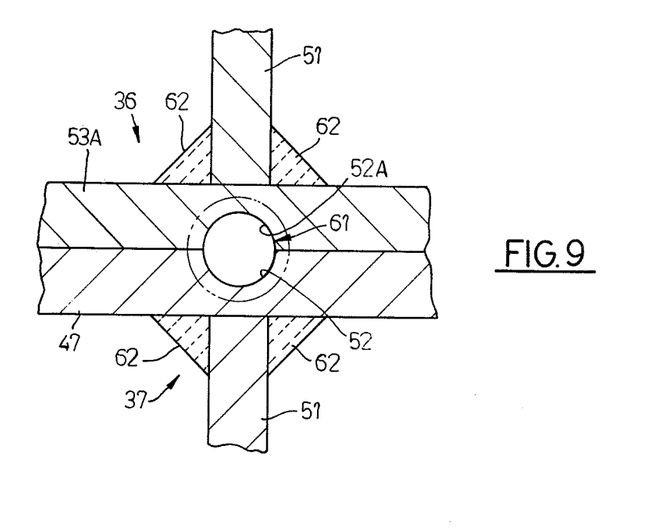
FIG. 9 is an enlarged cross-sectional view taken on line 9—9 of FIG. 7.
Figure 10:
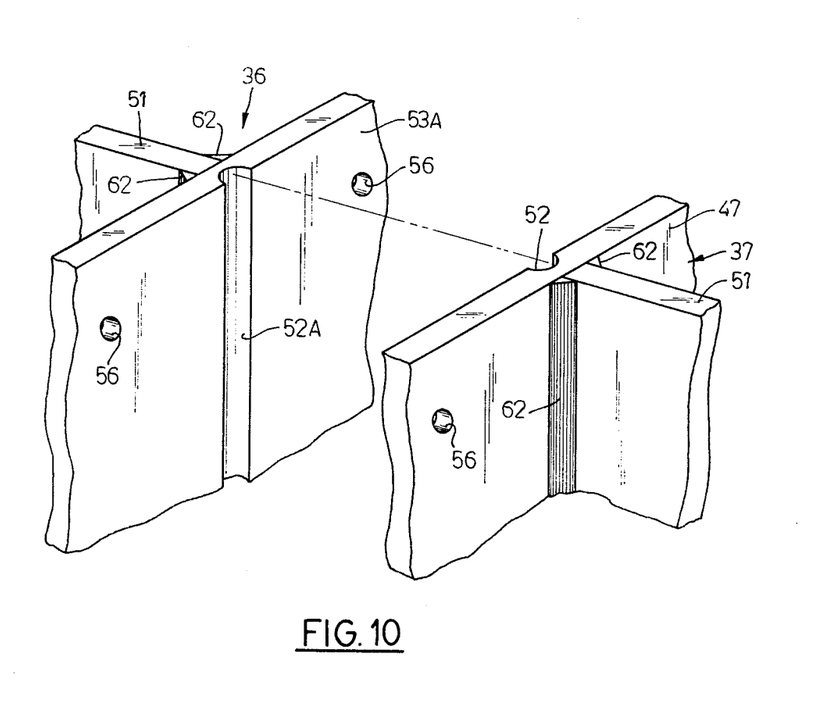
FIG. 10 is an exploded perspective view of the two subassemblies shown in FIGS. 4 through 7 prior to field assembly.

Each subassembly 35, 36 and 37 of frame 20 is generally similar in construction to another and, therefore, only subassembly 37 is hereinafter described in detail, except as otherwise noted. Subassembly 37 which is on the order of 40 feet long, 6 feet wide and 6 feet high or deep, is fabricated of steel plates which are on the order of ¾ to 4 inches thick and welded together at the factory, after certain machining operations are carried out where necessary at the factory on the plates. Thus, subassembly 37 comprises a bottom plate 44, a top plate 45, an outer side plate 46, an inner side plate 47, a front end plate 48 and a rear end plate 49. Subassembly 37 also comprises a plurality of internally located longitudinally extending plates 50 and laterally extending plates 51 which strengthen the subassembly and which are shown in phantom in FIG. 2. A laterally extending internal plate 51 is also shown in FIGS. 5 through 10. As FIGS. 9 and 10 show, an end of each internal plate 51 abuts a side plate 47, 53A or 53B and is fillet-welded thereto as at 62 in the factory. As FIGS. 5 through 8 show, each top plate 44 and bottom plate 45 is edge-welded or fillet-welded in the factory as at 63 to an associated side plate 47, 53A or 53B. Bottom plate 44 of subassembly 37 is provided with a plurality of weight-reducing holes or cutouts 44A and with the hereinbefore mentioned machined surface 40C, while top plate 45 has brackets 34 and 34b welded thereto.

Figure 5:
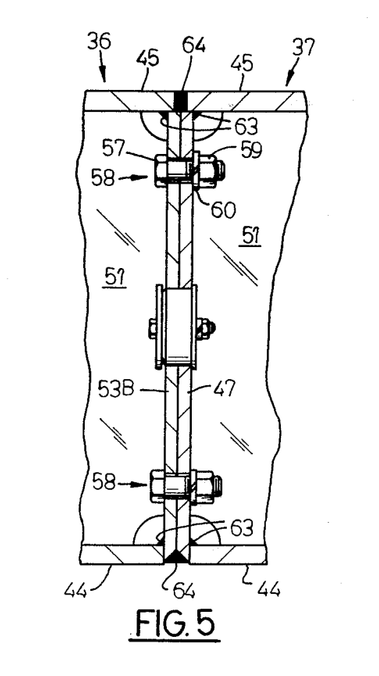
FIG. 5 is an enlarged cross-sectional view taken on line 5—5 of FIG. 2 showing the means for temporarily securing two subassemblies together during field assembly and prior to field welding.
Figure 13:
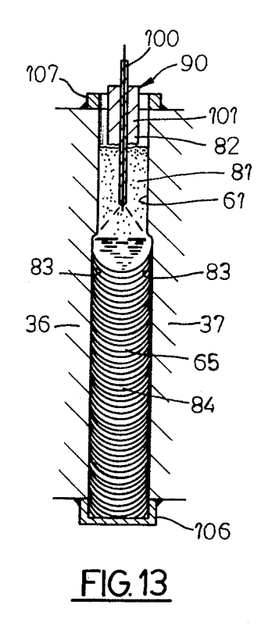
FIG. 13 is a view similar to FIG. 12 but showing solidified welding material partially filling the welding joint.

Inner side plate 47 of subassembly 37 is provided on its outer surface with a plurality of vertically extending welding grooves 52, preferably semi-circular in cross-section and having, for example, a radius of about ⅝ inches. Subassembly 36 comprises two side plates designated 53A and 53B and each is provided with a plurality of welding grooves 52A. The side plates 47 and 53A are each provided with a plurality of bolt holes 56 for receiving alignment bolts 57, such as are shown in FIG. 5. Each bolt 57 is part of a bolt assembly 58 which includes a nut 59 and lock washer 60. When two subassemblies, such as 36 and 37 are adjacent each other and their side plates 53A and 47, respectively, are in mating engagement, the welding grooves 52A and 52 are in alignment and define a plurality of welding joints 61, as FIGS. 1, 2, 7, 8 and 9 show. In the final assembly of frame 20, each welding joint 61 is filled with solidified welding material 65, as FIG. 13 shows, and adjacent subassemblies 35, 36 and 37 are fillet-welded to each other as at 64, as FIGS. 1, 2, 5 and 6 show.

Figure 6:
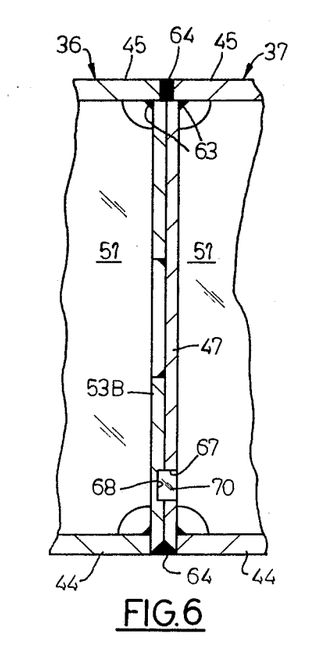
FIG. 6 is an enlarged cross-sectional view taken on line 6—6 of FIG. 2 showing the means for aligning two subassemblies during temporary securement and field welding.
Figures 7, 8:
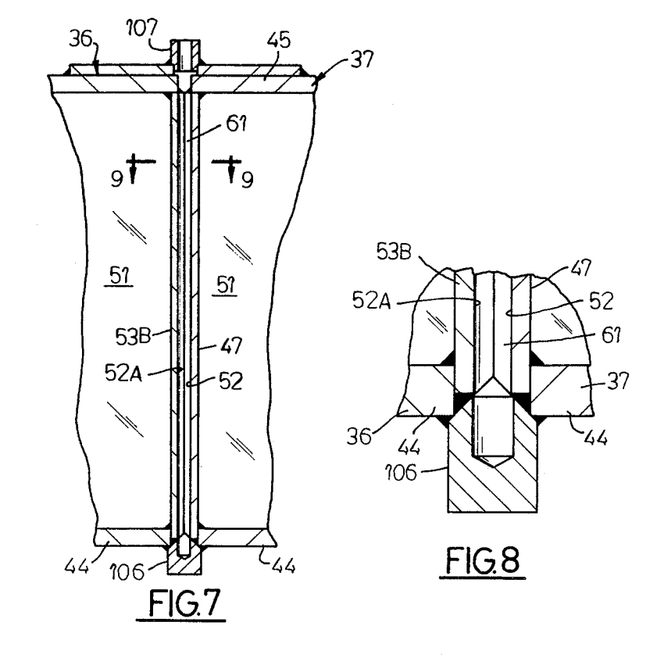
FIG. 7 is an enlarged cross-sectional view taken on line 7—7 of FIG. 2 shows welding groove in adjacent subassemblies aligned to define a welding joint.
FIG. 8 is an enlarged detail cross-sectional view of a welding sump for the welding joint shown in FIG. 7.

As FIGS. 4 and 6 show, the side plates 53A and 53B of subassembly 36 and the inner side plates 47 of subassemblies 35 and 37 are provided with key-receiving slots or keyways 67 and 68, respectively. When two subassemblies, such as 36 and 37 are adjacent each other and their side plates 53A and 47, respectively, are in mating engagement, the key-receiving slots 67 and 68, with a key 70 therein, are in alignment.

Each assembly 35, 36 and 37 is constructed at the factory as follows. The external plates 44, 45, 46, 47, 48 and 49 and the internal plates 50 and 51 are cut to a desired shape and size. Bottom plate 44 is provided with cutouts 44A. Side plates 47, 53, 53A are provided with drilled bolt holes 56, with welding grooves 52, 52A and with keyways 67, 68 at specified locations. The external and internal plates forming a subassembly 35, 36, 37 are then welded together as at 64 and 63.

The subassemblies 35, 36 and 37 are brought together into generally proper relationship, the keys 70 are placed in the keyways 67 and 68 to establish a precise relationship between adjacent subassemblies and the bolt assemblies 58 are implaced in the bolt holes 56 and fastened to rigidly secure the subassemblies together temporarily in a predetermined relationship.

With the subassemblies 35, 36 and 37 thus temporarily secured together at the factory, machining operations are carried out so as to provide the bearing surface 40 and the holes 34c in the brackets 34 and bores 41 and 41a. Measurements for these machining operations are carried out with reference to at least one predetermined and identifiable reference point P on frame 20, which reference point can be located at the situation requires, such as on the bearing surface 40.

When factory machining operations are completed and final factory assembly operations completed, the bolt assemblies 48 and keys 70 are removed and the finished subassemblies, 35, 36 and 37 are separated and shipped, as by railroad flatcar, to a jot site in the field remote from the factory where the final assembly of frame 20 and shovel 10 is to take place.

Upon arrival at the remote site, the subassemblies 35, 36 and 37 are again brought together in generally proper relationship, the keys 70 are placed in the keyways 67 and 68, and the bolt assemblies 58 are again implaced in the bolt holes 56 and fastened to secure the subassemblies together. The bolt assemblies 58 are adjustably tightened as required, while measurements and realignment procedures are carried out with respect to reference point P. When the machined surfaces 40A, 40B, 40C on the subassemblies 35, 36, 37, respectively, are realigned to the relative positions they occupied immediately after their being machined at the factory, the bolt assemblies 58 are finally tightened so as to maintain the precise relationship of the subassemblies 35, 36, 37 while the final welding procedures are carried out.

As hereinbefore explained, the frame 20 when field-assembled as described above, has a plurality of vertically extending, longitudinally spaced apart welding joints or holes 61 defined or disposed along the longitudinal seams between adjacent subassemblies 35, 36, 37.

Each welding joint or hole 61 is then filled with molten welding material, as by the process of electroslag welding as hereinafter described, which is allowed to solidify therein to join each pair of adjacent subassemblies 35, 36, 37 together permanently, whereupon the bolt assemblies 58 can, if desired, be removed, since they are no longer necessary.

Figure 11:
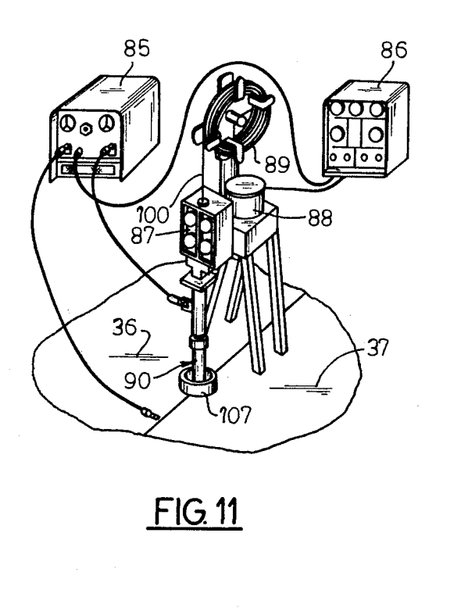
FIG. 11 is a perspective view of electroslag welding apparatus of the type employed to field weld the subassemblies together.
Figure 12:
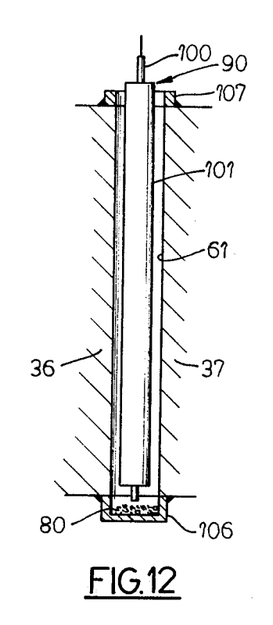
FIG. 12 is a schematic view showing a welding joint accummodating an elongated consumable electrode of the welding apparatus shown in FIG. 11.

Referring now to FIGS. 11, 12 and 13, the electroslag equipment and process will now be described in detail with regard to one welding joint 61 between subassemblies 36 and 37.

As FIG. 13 shows, electroslag welding as a welding process wherein coalescence is produced by molten slag 81 which melts a filler metal and the surfaces 83 of the work to be welded. The weld pool 84 is shielded by this slag 81 which moves upward in joint 61 across the full cross-section of the joint as welding progresses. The conductive slag 81 is maintained molten by its resistance to electric current passing between an electrode 90 and the work pieces 36 and 37.

The requirement required to utilize the electroslag welding process in accordance with the invention is conventional and includes: a welding machine or power source (usually one per electrode) 85; a control box 86 for wire feeding and oscillation; a guide tube torch and clamp assembly 87 which also provides oscillation when required; a wire feed drive motor 88 which may or may not be on the clamp assembly; and an electrode wire dispensing system 89.

The electrode 90 comprises a wire 100 which is directed to the bottom of the joint by a guide tube 101. The guide tube 101 also carries the welding current until the electrode passes from it. The guide tube 101 melts off just above the surface of the molten pool at the bottom of the slag 81.

The materials used to make the weld are electrode wire 100, electroslag flux 80, and guide tube 101. The flux 80 is a granular material with a specially balanced composition to provide stable operation. It must have the proper electrical conductivity and proper viscosity in the molten stage. It must also have deoxidizing properties and provide atmospheric shielding. The electrode wire 100 may be either a solid wire or a flux cored wire 1/16 to 3/16 inches in diameter. It must be material compatible to the base metal being welded and is supplied in coiles or reels. The guide tube 101 used is a heavy wall seamless tube. The welding, which is done in the vertical position, is an automatic welding process and once started it is carred to completion without interruption. As the weld progresses, the cavity 61 fills with filler metal in pool 84, the surface of the molten slag 81 rises and the guide tube 101 melts off just above the surface of molten metal below the slag.

There is no arc in connection with the welding process, except at the start-up of the weld (see FIG. 12) before the granulated flux 85 melts from the heat of the arc. The beginning of the weld is contained in a sump or starting tub 106 which is used to allow the process to reach stabilization and to ensure fusion of the parts being joined at the very beginning of the weld. A run-off tube or ceramic dam 107 is required to allow the molten flux to extend beyond the top of the joint so that the weld metal fuses the tops of the parts being joined. Both starting tube 106 and run-off tube or dam 107 are removed flush with the parts of the joint after the weld is completed.

Even though there is no vertical travel of the welding equipment with respect to the parts being welded, joints of extreme length can be made. Oscillation or traverse movement of the guide tube 101 can be used to ensure an even distribution of heat in the joint and thus maintains uniform penetration of weld metal into the parts being joined.

The welding process offers reduced welding costs, extremely high metal deposition rates (a deposition rate of 35 to 45 lbs. per hour per electrode) and the ability to weld very thick materials in one pass. A high quality weld deposit results, since the weld metal stays molten longer allowing gases to escape and slag to float to the surface. Minimized joint preparation is required, and the automatic process, once started, continues to completion, and all of the welding electrode is melted into the joint. In addition, the amount of flux consumed is quite small—usually in the ratio of one pound of flux for each 20 pounds of weld metal deposited.

Equipment and materials found suitable for use in carrying out the electroslag welding process in accordance with the invention are available from Hobart Brothers Technical Center, Troy, Ohio 45373 and such materials and equipment are described in detail in that company's publication entitled "Hobart Welding Process Manual—The Porto-slag Welding Process" Manual EW-412, Library of Congress Catalogue Card Number: 75-139119.

In prior art electroslag welding techniques, water cooled retaining shoes are required to be placed in contact with the joint sides to produce or help define the cavity that contains both the molten slag and the weld metal. Thus, the surface contour of the weld is determined by the contour of the molding or retaining shoes. The shoes, very often made of copper, need to be water-cooled. In the present invention, however, the use of detachable shoes, water-cooled or otherwise, is completely eliminated and the weld joint 61 is completely defined by the surfaces of the subassemblies which are to be joined together. Since the side plates 47, 53A, 53B are each on the order of about 1¼" thick, they are sufficiently massive to absorb and dissapate the heat from the molten metal in a joint 61 and to thereby effect self-cooling of the weld, thereby eliminating the need for water cooled shoes.

After all of the welding joints 61 of frame 20 have been filled with welding material as described above, the longitudinal exposed seams between adjacent subassemblies 35, 36, 37 are filled with welding material as at 64 using conventional welding techniques.

When frame 20 is finish-welded, the bolt assemblies 58 can be removed, if desired, and the components forming mining shovel 10 are then added and secured to frame 20 in whatever order is deemed most suitable.

Carbody 13 and boom 21 are also factory manufactured and field aligned and welded in a similar manner using the electroslag techniques described for the revolving frame 20.

I claim:

1. A method of fabricating a structure comprising the steps of:
    providing a pair of metallic members which are to be joined together to form said structure, said members having surfaces which abut when said pair of members are joined together;
    forming grooves in said surfaces of said members which align to define passages when said pair of members are joined together;
    temporarily joining together said members with said grooves aligned to define said passages;
    performing a machining operation on said members while said members are temporarily secured together so as to provide a first finished surface on one member which is precisely aligned with a second finished surface on the other member;

disjoining said members after said machining operation is performed and transporting said members to another location;

rejoining said members together at said other location with said grooves aligned to define said passages and with said first and second finished surfaces precisely realigned;

filling said passage with molten welding material which fuses to the sides of said passage;

and allowing said molten welding material to cool and solidify in said passage to join said metallic members together.

2. A method according to claim 1 wherein said molten welding material cools and solidifies as a result of heat dissipation into said metallic members defining said structure.

3. A method according to claim 1 wherein the step of filling said passage with molten welding material is accomplished by an electroslag welding process.

4. A method according to claim 1 including the additional steps of:

forming keyways in the said surfaces of said members;

and inserting alignment keys in said keyways prior to the step of temporarily joining said members together and prior to the step of rejoining said members together.

5. A method for fabricating a structure from a pair of subassemblies comprising the steps of:

providing at least a pair of subassemblies, each subassembly including a plate which abuts a corresponding plate in an adjacent subassembly in said structure, each subassembly having at least one groove in its said plate;

temporarily joining said pair of subassemblies together so that the grooves are in registry with each other and define a passage;

performing a precise machining operation on portions of said pair of subassemblies while the latter are temporarily joined;

disjoining said pair of subassemblies;

transporting said pair of subassemblies to another location;

rejoining said pair of subassemblies so that said grooves are again in registry with each other and so that said portions on which said precise machining operation was performed are substantially in the same relative relationship to each other as when the machining operation was performed;

filling said passage with molten welding material which fuses with the walls of said passage and which is allowed to solidify therein to join said pair of subassemblies to one another.

6. A method according to claim 5 wherein said molten welding material cools and solidifies as a result of heat dissipation into said metallic members defining said structure.

7. A method according to claim 5 wherein the step of filling said passage with molten welding material is accomplished by an electroslag welding process.

8. A method according to claim 5 including the additional steps of:

forming keyways in the said surfaces of said members;

and inserting alignment keys in said keyways prior to the step of temporarily joining said members together and prior to the step of rejoining said members together.

* * * * *